J. J. CAREY.
COUPLING FOR GAS HOSE.
APPLICATION FILED MAR. 27, 1916.

1,192,860.

Patented Aug. 1, 1916.

WITNESSES:

INVENTOR
John J. Carey
BY
ATTORNEY

UNITED STATES PATENT OFFICE.

JOHN J. CAREY, OF BROOKLYN, NEW YORK.

COUPLING FOR GAS-HOSE.

1,192,860.  Specification of Letters Patent.  Patented Aug. 1, 1916.

Application filed March 27, 1916. Serial No. 86,849.

*To all whom it may concern:*

Be it known that I, JOHN J. CAREY, a citizen of the United States, and a resident of Brooklyn, in the county of Kings and State of New York, have invented certain new and useful Improvements in Couplings for Gas-Hose, of which the following is a specification.

This invention relates to a gas hose coupling of novel construction, by which the supply of gas is automatically cut off when the hose slips off the nipple of the gas stove or lamp.

Figure 1:
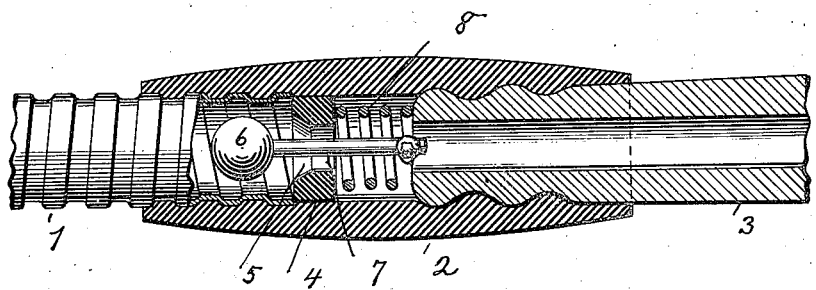
Figure 2:
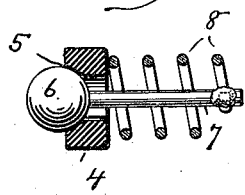
Figure 3:
Figure 4:
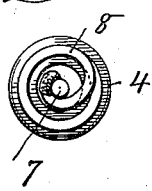

In the accompanying drawing: Figure 1 is a longitudinal section of a coupling embodying my invention; Fig. 2, a longitudinal section partly in side view of the valve and valve seat; Fig. 3, a left hand end view of Fig. 2, and Fig. 4, a right hand end view thereof.

The device comprises essentially, a gas hose 1, which projects into one end of a flexible tubular sleeve 2, made of rubber, while the other end of the sleeve is adapted to be slipped over the nipple 3 of a gas stove or lamp. To the inclosed end of hose 1, there is cemented an annular disk 4, having a cup-shaped socket 5 that constitutes a valve seat. This seat is adapted to be engaged by a valve 6 that plays within hose 1 and has a stem 7, which protrudes through disk 4 into sleeve 2. Stem 7, is encompassed by a spiral spring 8, that is secured to stem 7 at one end, and bears against disk 4 with its other end. The convolutes of the spring are arranged in proximity to the inner face of sleeve 2, and do not impair the flow of gas through the latter. Valve 6 is made of spherical- or true ball shape, so that it will tightly fit its seat, at any position of the valve.

When the sleeve is slipped over nipple 3, the end of the nipple will by bearing against spring 8, compress the latter and open the valve 6 (Fig. 1). Should the sleeve work loose or accidentally slip off the nipple, the pressure on spring 8 is relaxed, and the valve will close against its seat to prevent leakage or cut off the further supply of gas (Fig. 2). So also should the sleeve become bent owing to extensive use or deterioration of the rubber, and the play of the valve would hence cease to be co-axial with the hose, the ball will owing to its spherical form, freely creep along the inner side of the latter and will tightly close upon its seat at any angle its stem may be made to assume.

I claim:

1. A coupling comprising a flexible sleeve, a gas hose projecting into one end thereof, an annular valve disk fitted against the inner end of the hose, a coacting valve located within the hose and having a stem that projects through the disk into the sleeve, and a spiral spring mounted on the stem within the sleeve, said spring being adapted to be directly engaged by the end of a gas-receiving nipple projected into the other end of the sleeve.

2. A coupling comprising a flexible sleeve, a gas hose projecting into one end thereof, an annular valve disk fitted against the inner end of the hose and having a cupped seat, a coacting ball valve located within the hose and having a stem that projects through the disk into the sleeve, and a spiral spring mounted on the stem within the sleeve, said spring being adapted to be directly engaged by the end of a gas-receiving nipple projected into the other end of the sleeve.

JOHN J CAREY.